United States Patent Office 3,763,272
Patented Oct. 2, 1973

3,763,272
FLEXIBLE PHENOLIC CARBAMIDO RESINS
Sung Ki Lee, Niagara Falls, N.Y., assignor to Hooker Chemical Corporation, Niagara Falls, N.Y.
No Drawing. Continuation-in-part of application Ser. No. 849,259, Aug. 1, 1969, which is a continuation of application Ser. No. 569,062, Aug. 1, 1966, both now abandoned. This application Mar. 29, 1971, Ser. No. 129,234
Int. Cl. C08g 37/18, 41/04
U.S. Cl. 260—841
10 Claims

ABSTRACT OF THE DISCLOSURE

Flexible thermosetting phenolic resinous compositions, useful as coatings, adhesives, rubber tackifiers, reaction plastics and diluents and the like, are prepared by condensing a polymer containing a segmer having at least one displaceable hydrogen atom attached to a carbamido nitrogen function, such as a polyamide, with an aldehyde in the presence of an aromatic compound containing an ortho-para activating group, such as phenol, and a hydrogen bonding solvent at a pH less than 7 and at a temperature between about minus 20 and about 200 degrees centigrade, and recovering the product so produced.

---

This is a continuation-in-part of Ser. No. 849,259 filed Aug. 1, 1969, now abandoned, which is a continuation application of Ser. No. 569,062, filed Aug. 1, 1966, now abandoned.

It is a further object to provide a general purpose hetero chain polymer which has a wide range of application in the fields of thermoset as well as thermoplastic resins.

Another object is to prepare a polymer which has both controllable flexibility and curability.

Another object is to prepare a polymer which can be used as a base resin intermediate which can be used as such or reacted further to produce a flexible phenolic resin.

A further objective is the preparation of materials suitable for use in coating compositions, molding compositions, textile treatments, laminating compositions, etc.

These and other related objects are achieved by the discovery of a method for preparing a flexible thermosetting polymer in one reaction vessel which comprises:

Condensing a polymer containing a segmer having at least one displaceable hydrogen atom attached to a carbamido nitrogen functional with an aldehyde defined by the formula:

$$R-\overset{O}{\underset{\|}{C}}-H$$

where R is H, formyl (—CHO), formylalkylene (wherein the alkylene group has one to 18 carbon atoms), lower alkyl containing one to 18 carbon atoms, halogen substituted alkyl where the substituents are selected from chlorine, fluorine, bromine, iodine, cycloalkyl having from three to 20 carbon atoms, cycloalkene having from three to 12 carbon atoms, piperidyl, pyridyl, thienyl, furyl and aryl having six to 30 carbon atoms, substituted aryl where the substituents are selected from lower alkyl of one to 20 carbon atoms, halogen selected from chlorine, fluorine, bromine, iodine, nitro, nitroso, nitrato, sulfato, lower alkoxy having one to 30 carbon atoms, aryloxy having six to 30 carbon atoms, in the presence of an aromatic compound containing an ortho-para activating group selected from the group consisting of a defined phenol, a defined aromatic mercaptan, a defined resole, and mixtures thereof; and recovering the product so produced. It is to be understood that when the R in the aldehyde is H, that is, when the aldehyde is formaldehyde, this includes aqueous formaldehyde as well as the non-aqueous forms of formaldehyde such as paraformaldehyde and symmetrical trioxane.

One of the especially remarkable aspects of this process is that the condensation can be carried out within a wide range of reactant ratios, depending upon the properties of the desired end product. That is, the mole ratio of segmer to aldehyde to aromatic compound need not necessarily be one to one to one.

Although many of the polymers containing the segmer having the displaceable hydrogen, such as polyamides, are not soluble in ethanol or the common organic solvents due to their strong internal hydrogen bondings (unless they have been degraded or are in a low molecular weight range), the condensation polymeric compositions obtained by this invention are soluble in ethanol.

Similarly, most of the phenol-formaldehyde type novolacs have a limited solubility in ethanol and the common solvents, but the condensation product of this invention is completely soluble in ethanol and other alcohols.

The mole weight of the condensation product obtained by this invention is much greater than the reactant species of starting polymer(s), thus indicating very little or no degradation of the starting polymer(s) occurs. This also indicates a true condensation takes place between the polymer and the reactants. Prior art modifications of polyamides with phenol and formaldehyde at an elevated temperature (e.g., the boiling temperature of phenol) have been carried out; however, such direct modifications at elevated temperature defeat the objects of this invention because of the sensitivity of the polyamide types of polymers to degradation by hydrolysis, alcoholysis, aminolysis and thermal induction. It is important that this reaction be carried out under acidic conditions, i.e., at a pH of less than seven. At a pH above seven the desired reaction will not take place. Instead, for instance, the conventional phenol-formaldehyde type condensation takes place without reacting with the polyamide.

The starting polymer for the method of this invention can be formed in situ during the process. For instance, in the case of acryloamide and caprolactam, these will polymerize in situ during the reaction with the aldehyde and the ortho-para directing aromatic compound. In general, however, the starting polymer preferably has a degree of polymerization of about 10 (i.e., DP=10) or more and contains at least one segmer having a carbamido function. It is to be understood, however, that the starting polymer may have a degree of polymerization higher than ten, such as a DP of 100, and may have more than one segmer having a carbamido function in it.

The process of my invention can be carefully followed by the use of conventional infrared analysis and by the more recent technique of Attenuated Total Internal Reflection (also known in the art as "ATR").

Equation 1 illustrates the reaction when a polyamide is used as the polymer containing a segmer having at least one displaceable hydrogen:

(1) 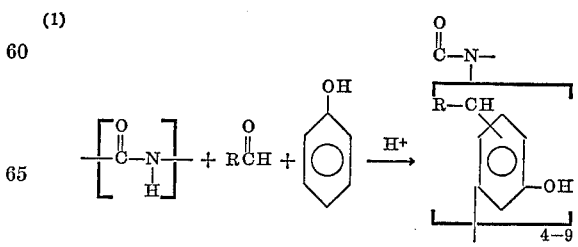

where R is as defined above.

Equation 2 illustrates the invention when an alkylated urea-formaldehyde polymer is used as the polymer containing a segment having at least one displaceable hydrogen and reacted with formaldehyde in the presence of phenol:

(2)
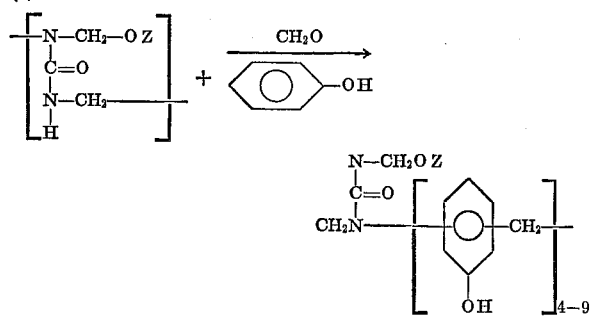

where Z is lower alkyl of one of 18 carbon atoms, and aryl of six to 20 carbon atoms.

Equation 3 illustrates the invention when a polyurethane prepolymer is used as the polymer containing a segmer having at least one displaceable hydrogen and reacted with formaldehyde in the presence of phenol:

(3)
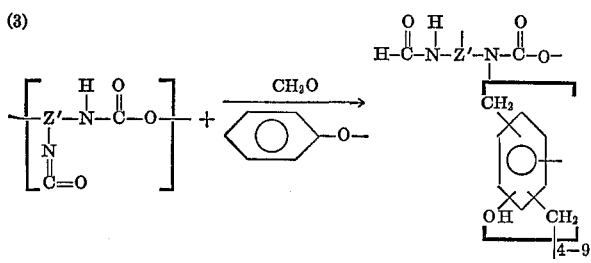

where Z' is lower alkylene of one of 18 carbon atoms or arylene of six to 20 carbon atoms.

Equation 4 illustrates the reaction when a polyurethane polymer is used as the polymer containing a segmer having at least one displaceable hydrogen and reacted with formaldehyde in the presence of phenol:

(4)
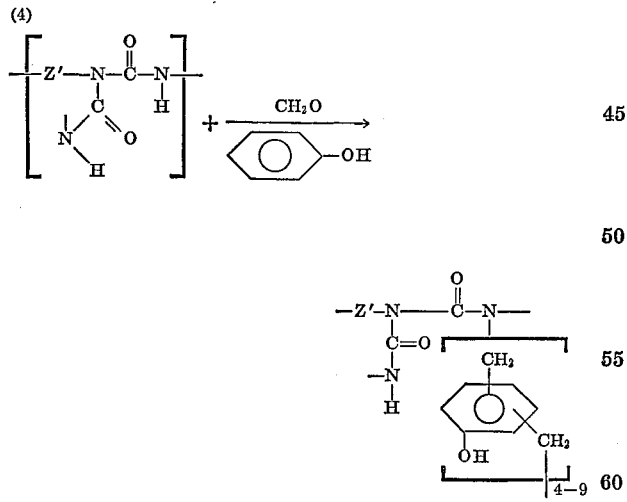

where Z' is defined above.

Equation 5 illustrates the reaction when a polyamide is used as the polymer containing a segmer having at least one displaceable hydrogen and reacted with formaldehyde in the preesnce of a thiophenol:

(5)
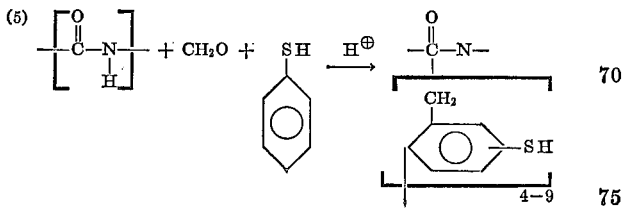

Equation 6 illustrates the reaction when a polyamide is used as the polymer containing a segmer having at least one displaceable hydrogen and reacted with formaldehyde in the presence of aniline:

(6)
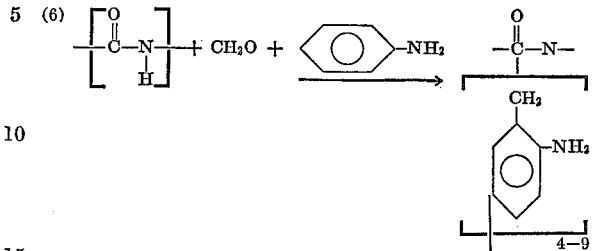

Equation 7 illustrates the reaction when a polyamide is used as the polymer containing a segmer having at least one displaceable hydrogen and reacted with formaldehyde in the presence of thiourea:

(7)

Equation 8 illustrates the reaction when polyamide is used as the polymer containing a segmer having at least one displaceable hydrogen and reacted with formaldehyde in the presence of phosphoric acid and phenol.

(8)

Equation 9 illustrates the reaction when a polyacrylamide is used as the polymer containing a segmer having at least one displaceable hydrogen and reacted with formaldehyde in the presence of phenol:

(9)

Equation 10 illustrates the reaction when a polyamide is used as the polymer containing a segmer having at least one displaceable hydrogen and condensed with formaldehyde in the presence of a nitrite:

(10)

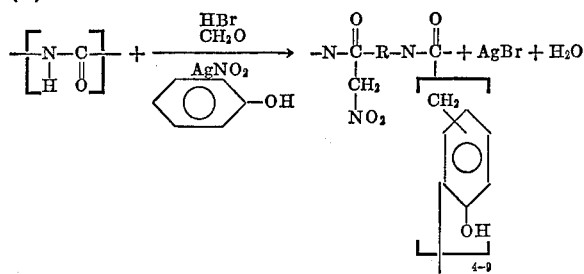

Equation 11 illustrates the reaction when a polyamide is used as the polymer containing a segmer having at least one displaceable hydrogen and condensed with glyoxal:

(11)

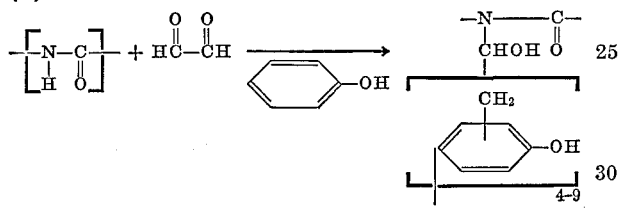

Equation 12 illustrates the reaction when a bis-aminomethylolation of a polyamide is effected in accordance with the method of this invention with glyoxal to produce a resole, which is then reacted with phenol to produce a phenolic resin:

(12)

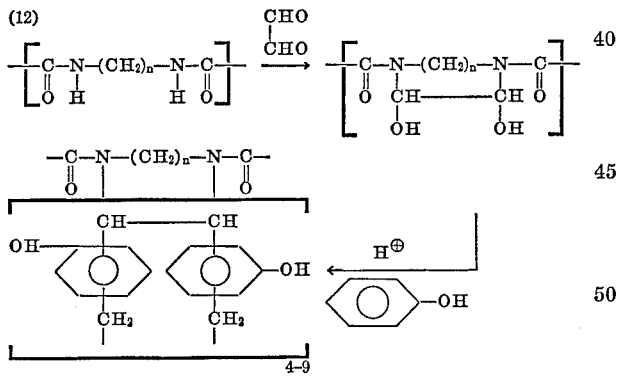

Equation 13 illustrates the reaction when a polyamide is used as the polymer containing a segmer having at least one displaceable hydrogen and condensed with a resole:

(13)

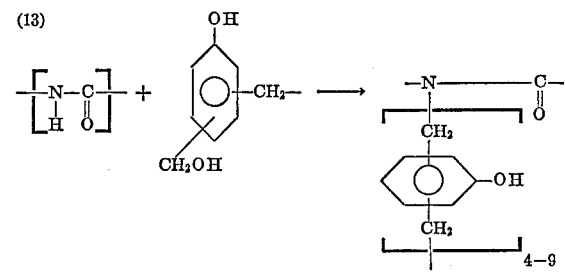

The displaceable hydrogen in the segmer of the polymer is attached to a carbamido group in the segmer. That is, the nitrogen atom may be an integral part of the polymer chain, or it may be pendant from it. It may also be a terminal group. For the purposes of this invention, the carbamido functional has the possible mesomeric structures shown in Equation 14:

(14)

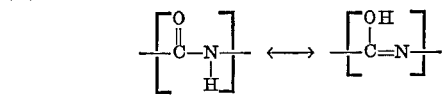

Among the polymeric materials containing segmer having at least one displaceable hydrogen atom which may be used in this invention are: polyamides such as those known as nylons, polyacryloamide, cyclic amido such as caprolactam, pyrrodone and polymethylene lactams, alkylated melamine formaldehyde resins, polyurethane materials including the prepolymer materials. When the polymer has a segmer containing two displaceable hydrogen atoms, such as in the case of a terminal amide group, and in the case of a pendant amide group, the condensation may produce two groups pending from the atom containing the displaceable hydrogen, as is illustrated by Equation 15. Other polymers are polypeptides, poly(hexamethylene-m-benzene disulfonamide), and urea formaldehyde resins.

(15)

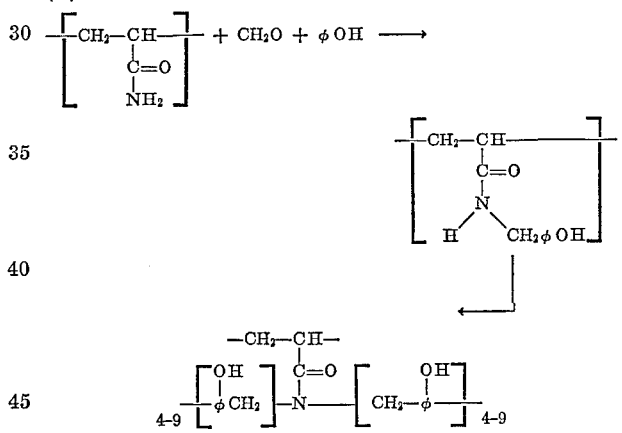

The number of displaceable hydrogen atoms in the segmer will determine the number of reaction sites in the polymer and the amount of cross-linking or grafting which will take place between the polymer and the phenolic resin.

This reaction may also be known as a hydroxyalkylation. When the aldehyde used is formaldehyde, the methyl group is unsubstituted, whereas when some other aldehyde is used, the methyl group can be considered to be substituted with an alkyl or aryl substituent. For instance, when benzaldehyde is the aldehyde to be used, this can be considered to be a benzene substituted methylolation reaction. In this art, this type of reaction is known by either term, namely, methylolation or hydroxyalkylation.

While most of the equations above use formaldehyde to illustrate the reaction, it is to be understood that any aldehyde reactive with displaceable hydrogen may be used in this invention. Examples of aldehydes to be embraced within the scope of this invention are formaldehyde, acetaldehyde, propionaldehyde, butyraldehyde, isobutyraldehyde, benzaldehyde, furfural, 2-ethylhexanal, ethylbutyraldehyde, heptaldehyde, dialdehydes such as glyoxal, aldols such as hydroxyacetaldehyde, crotonaldehyde, acrotein, halogenated aldehydes where the halogens are selected from chlorine, fluorine, bromine, iodine and ω-formyl polymethyleneaaldehyde such as adipaldehyde.

The products of the invention contain units of the formula:

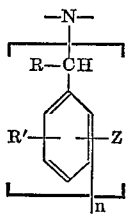

wherein Z is selected from the group consisting of —OH, —SH, and —NH₂ and $n$ has a value of 4–9, R is selected from the group consisting of hydrogen, formyl (—CHO), formalkylene, alkyl, cycloalkyl, and cycloalkene and R' is selected from the group consisting of hydrogen, halogen, alkyl, cycloalkyl aryl and aralkyl groups.

Examples of phenols which may be used in preparing the flexible phenolic resin of this invention include phenol itself and substituted phenols having the following general formula:

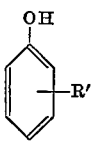

where R' may be H, F, Cl, Br or a suitable substituent selected from the following:

(a) Alkyl groups of one to 18 carbon atoms in any of their isomeric forms and substituted on the phenolic nucleus in the ortho or para positions;

(b) Alicyclic groups of five to 18 carbon atoms such as cyclohexyl, cyclopentyl, methylcyclohexyl, butylcyclohexyl, etc.;

(c) Aromatic or aralkyl groups of six to 18 carbon atoms such as phenyl, alpha-methylbenzyl, benzyl, cumyl, etc.

Suitable substituted phenols include the following:

para-tertiary-butylphenol,
para-secondary butylphenol,
para-tertiaryamylphenol,
para-secondary-amylphenol,
para-tertiary-hexylphenol,
para-isooctylphenol,
para-phenylphenol,
para-benzylphenol,
para-cyclohexylphenol,
para-decyl-phenol,
para-dodecyl-phenol,
para-tetra-decyl-phenol,
para-octa-decyl-phenol,
para-nonyl-phenol,
para-methyl-phenol,
para-beta-naphthyl-phenol,
para-alpha-naphthyl-phenol,
para-pentadecyl-phenol,
para-cetyl-phenol,
para-cumyl-phenol,
para-hydroxy acetophenone,
para-hydroxy benzophenone, a phenol reacted or alkylated with limonene in any of its isometric d-, l-, or dl-forms, a phenol alkylated with styrene, a phenol alkylated with pinene in any of its isomeric d- or l-forms, a phenol alkylated with oleic acid, as well as the corresponding ortho and meta derivatives such as meta-butylphenol and ortho-butylphenol, as well as mixtures thereof.

From the foregoing, it is apparent that substantially any phenol may be used in practicing the present invention provided it has a reactive phenolic hydroxyl group and is capable of reacting with the hydroxy methyl group pending from the polymer. The pure refined phenols may be used, but this is not always necessary. For instance, phenols may be alkylated and then reacted with an aldehyde as the crude product which may contain some polyalkylated as well as unalkylated phenols. Mixtures of phenols mentioned above may also be used.

Examples of mercaptans which may be used in preparing the flexible phenolic resin of this invention include thiophenol itself (mercaptophenol) and substituted phenols having the following general formula:

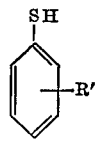

where R' may be H, halogen such as F, Cl, Br or a suitable substituent selected from the following:

(a) Alkyl groups of one to 18 carbon atoms in any of their isomeric forms and substituted on the thiophenolic nucleus in the ortho or para positions;

(b) Alicyclic groups of five to 18 carbon atoms such as cyclohexyl, cyclopentyl, methylcyclohexyl, butylcyclohexyl, etc.;

(c) Aromatic or aralkyl groups of six to 18 carbon atoms such as phenyl, alpha-methylbenzyl, benzyl, cumyl, etc.;

Suitable substituted thiophenols include the following:

para-tertiary-butylthiophenol,
para-secondary-butylthiophenol,
para-tertiary-amylthiophenol,
para-secondary-amylthiophenol,
para-tertiary-hexylthiophenol,
para-isooctylthiophenol,
para-phenylthiophenol,
para-benzylthiophenol,
para-cyclohexylthiophenol,
para-decylthiophenol,
para-dodecylthiophenol,
para-tetradecylthiophenol,
para-octadecylthiophenol,
para-nonylthiophenol,
para-methylthiophenol,
para-beta-naphthylthiophenol,
para-alpha-naphthylthiophenol,
para-pentadecylthiophenol,
para-cetylthiophenol, and
para-cumylthiophenol.

Examples of nitrites which may be used in this invention are illustrated as follows: silver nitrite, alkali metal nitrites such as sodium and potassium, and mercuric nitrite ($HgNO_2$).

Examples of aniline which may be used in preparing the novolac of this step include aniline itself and substituted aniline having the following general formula:

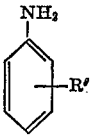

where R' may be H, F, Cl, Br, I, or a suitable substituent selected from the following:

(a) Alkyl groups of one to 18 carbon atoms in any of their isomeric forms and substituted on the aniline nucleus in the ortho or para positions;

(b) Alicyclic groups of five to 18 carbon atoms such as cyclohexyl, cyclopentyl, methylcyclohexyl, butylcyclohexyl, etc.;

(c) Aromatic or aralkyl groups of six to 18 carbon atoms such as phenyl, hydroxyphenyl, alpha-methylbenzyl, benzyl, cumyl, etc.;

Suitable substituted anilines include the following:

para-tertiary-butylaniline,
para-secondary-butylaniline,
para-tertiary-amylaniline,
para-secondary-amylaniline,
para-tertiary-hexylaniline,
para-isooctylaniline,
para-phenylaniline,
para-benzylaniline,
para-cyclohexyl-aniline,
para-decyl-aniline,
para-dodecyl-aniline,
para-tetra-decyl-aniline,
para-octa-decyl-aniline,
para-nonyl-aniline,
para-methyl-aniline,
para-beta-naphthyl-aniline,
para-alpha-naphthylaniline,
para-pentadecyl-aniline,
para-cetyl-aniline,
para-cumylaniline, and the like.

In instances where a novolac is prepared from a phenol, that is, an aromatic composition having a hydroxy group attached to it, it is preferred that the reaction take place in the presence of an acid catalyst such as sulfuric acid, hydrochloric acid, or oxalic acid and formic acid. In some instances, catalysts may not be necessary. Since most of the polyamides and their derivatives are strongly hydrogen bonded intramolecularly, it is desirable that such hydrogen bonding be freed before one carries out the condensation reactions. This can be accomplished by simply dissolving the materials in suitable hydrogen bonding solvents such as anhydrous formic acid, trifluoroacetic acid and anhydride, and phenolic derivatives and mixtures thereof, in which hydrogen bonding to the solvent competes with the intramolecular hydrogen bonding of the polymer and a substantially homogeneous solution results. Such operations must be carried out under a controlled condition if one is to avoid polymer degradation. The conditions which I have found to be satisfactory include temperatures between about −20 degrees centigrade to the temperature at which degradation by aminolysis, alcoholysis or hydrolysis occurs. This latter temperature depends on the specific polymer and in some cases can be as low as 70 degrees centigrade and in other polymers is much higher, for instance, about 200 degrees centigrade. As the substitution of displaceable hydrogens proceeds, the polymer becomes less susceptible to substantial degradation, and therefore the operating temperature can be raised substantially.

For purposes of convenience, it can be considered that the reaction of the displaceable hydrogen on the carbamido group with a phenolic compound and an aldehyde is the primary reaction. However, it is one of the unique aspects of this invention that the above-described condensation can also be carried out in the presence of secondary reacting species to give polymeric compounds containing the principal elements of said secondary reacting species, thus further diversifying the potential applicability of these products. Examples of reactions involving such secondary reacting species are illustrated in Equations 7, 8 and 10.

The reactions illustrated above can be carried out as separate reactions, that is, in separate reaction vessels. However, it is another of the unique discoveries of this invention that each reaction can be carried out in a single reaction vessel in sequence, thus simplifying the reaction procedure and economic requirement.

The products produced by the process of this invention are resinous in nature varying from liquids of varying viscosity to solids.

The flexible phenolic base resins of this invention are useful for a multitude of purposes, including interior can coatings, drum and pail linings, wire coatings, laminating resins (cold punching), baking primers, adhesives, pipe coatings, reactive plasticizers and diluents, phenolic molding resins, foundry resins, grinding wheel binders, rubber tackifiers, piper coatings, textile treatments, and the like.

The invention is further illustrated in the following illustrative examples which are given for purposes of illustration only and are not to be construed as limiting except as defined in the appended claims. Unless otherwise indicated, all parts are by weight and temperatures are in degrees centigrade.

EXAMPLE 1

Preparation of polyamide modified flexible phenolic resin by reaction of nylon with phenol and formaldehyde in the presence of anhydrous formic acid Into a one-liter three-necked flask equipped with a thermometer, stirrer and addition funnel were charged 60 grams of nylon 66, 240 grams of phenol and 60 grams of formic acid. The resulting mixture was stirred at 65 degrees centigrade to give a homogeneous solution (approximately one hour). To this homogeneous solution 290 grams of 37 percent aqueous formaldehyde were added dropwise so as to maintain a clear reaction mixture. After completion of addition, the reaction mixture was stirred at 60 degrees centigrade for one hour, then water removal under reduced pressure was carried out until the reaction mixture gave a clear, transparent and very viscous resin. Such resin is completely soluble in alcohols and contains about 10 to 20 percent of polyamide and has a molecular weight of $\overline{Mn}$. 100,000–300,000. At this point, 480 grams of denatured ethanol (2B) were added to the reaction flask to give a clear alcohol solution. This alcohol solution can be used directly on coatings or casting of films and can be cured at about 13 degrees centigrade in 15 minutes to give a flexible product.

EXAMPLE 2

To a suitable laboratory resin flask equipped with a thermometer, stirrer and addition funnel were charged 60 grams of Zytel (nylon 66), 240 grams (255 moles) of phenol, and 60 grams of 90 percent formic acid. The nylon 66 had 0.265 unit moles having 200 amide groups with DP=100 (displaceable hydrogen), in it. The resulting mixture was stirred under a nitrogen atmosphere at 60 degrees centigrade until solution was complete (approximately one to about 1.5 hours later). To this homogeneous solution 290 grams (3.57 moles) of 37 percent formaldehyde were added. This was done slowly, dropwise to prevent polymer reaction. A homogeneous solution was maintained throughout the reaction. After completing addition of formaldehyde, the reaction mixture was stirred for about 1.5 hours at 60 degrees centigrade. Then the dehydration of water was started by the use of a water aspirator at 40–50 degrees centigrade. As soon as the reaction mixture cleared up, 50 milliliters of normal-butanol were added and the mixture stirred for ten minutes to give a much less viscous reaction mixture. The dehydration was continued until the theoretical amount of water was collectd. The completion of the reaction can be followed by the alcohol solubility of the reaction product. The product had the properties shown in Table I:

TABLE I

Physical properties of polyamide modified flexible phenolics

| | |
|---|---|
| State | Viscous liquid. |
| Color | White. |
| Percent nitrogen | .5–2.5 percent. |
| OH Number | 200–400. |
| Molecular weight | 90,000–350,000. |
| Viscosity | 20–60 (stokes) |
| Non-volatile matter | 99 percent. |
| Transparency | Good. |
| Total amide backbone | 10–20 percent. |

EXAMPLE 3

Polyamide based flexible phenolic molding resin

A high mole weight (about 35,000) polyamide (nylon 66) was converted to an alcohol soluble molding resin by the following one-step process:

| Material | Weights | Equivalents, unit mole |
|---|---|---|
| Nylon 66 | 60.0 | 0.265 |
| Phenol | 188.0 | 2.0 |
| (90 percent) formic acid | 60.0 | |
| (37 percent) formalin | 290.0 | 3.75 |
| o-Cresol | 55.0 | 0.5 |
| Urea | 90.0 | 1.5 |
| n-Butanol | 100.0 | |

To a suitable laboratory resin flask equipped with a thermometer, stirrer, nitrogen inlet and addition funnel were charged 60 parts of Zytel (nylon 66), 188 parts of phenol, 55 parts of o-cresol, and 60 parts of formic acid. The resulting mixture was stirred under a nitrogen atmosphere at 60 degrees centigrade until solution was complete (about 1–2 hours). To this homogeneous solution 290 parts of formalin were added. This was done slowly, dropwise to prevent polymer separation and required about 1.5 hours. The homogeneity of reaction mixture was maintained until about 80 percent of the formalin was added. After the completion of the addition, the reaction mixture was stirred at 60–70 degrees centigrade for an additional 0.5 hour, at which time the reaction mixture was a very viscous resin. At this point 100 parts of n-butanol were added to the reaction mixture and stirred for 10 minutes. Then 90 parts of urea were added to the reaction mixture and stirred for 10 minutes. The reaction mixture was then subjected to dehydration and de-alcoholation during a period of two hours under vacuum of 12–15 millimeters mercury and a pot temperature of 35–45 degrees centigrade to give clear viscous resin. The resulting resin can be formulated into flexible phenolic molding compounds.

EXAMPLE 4

In a manner after Example 3, when 1.5 moles of anhydrous phosphoric acid are substituted for urea, a phenolic resin is produced which can be formulated into flexible phenolic molding compounds.

EXAMPLE 5

In a manner after Example 3, when 1.5 moles of anhydrous silver nitrate are substituted for urea, a phenolic resin is produced which can be formulated into flexible phenolic molding compounds.

EXAMPLE 6

Polyacrylamide modified flexible phenolics from acrylamide, phenol and formaldehyde In a suitable flask equipped with stirrer, gas inlet, thermometer and condenser were placed 51.8 parts of acrylamide and 414.7 parts of distilled water. The acrylamide solution was stirred and heated to 65–70 degrees centigrade under a rapid stream of carbon dioxide. Then 7.7 parts of isopropyl alcohol and 0.096 part of potassium persulfate were added. The temperature of reaction was maintained at 75–80 degrees centigrade for two hours under the steam bath. The product obtained is a very viscous, clear, colorless solution. To this viscous solution were added 100 parts of phenol and the temperature was lowered to about 50 degrees centigrade. Then 90 parts of 37 percent aqueous formaldehyde were added dropwise. Then the reaction mixture was stirred at room temperature for two hours. At the end of the reaction the water solvent was removed under reduced pressure to give a rubbery polymer which can be cured in the usual manner to a thermoset, yet flexible resin.

EXAMPLE 7

Preparation of polyacrylamide modified flexible phenolic resin from polyacrylamide Polyacrylamide (70 parts) was dissolved in 500 parts of water and charged into a reaction flask as described in Example 6. To this, 100 parts of a water soluble resole (phenol-formaldehyde resin) A-stage phenolic resin was added. The reaction pH was adjusted to 4.5 by adding formic acid. The resulting product was stirred at room temperature for two hours and worked up in a manner after Example 6.

EXAMPLE 8

Films were made from the product whose properties are described in Table I, by diluting with ethanol to sprayable viscosity. No additives or flow controlling agents were used. The resins were coated on standard Q panels, tin can stocks by means of a blade applicator (ASTM D-1436) and cured in a draft oven at 170 degrees centigrade for 30 minutes. Fexibility was checked with a conical mandrel over ⅛ inch diameter, and in the case of can stocks, bent into two 180-degree folds made at right angles (approximate) and the sharp edge examined. In all cases the film passed these standard tests with a rating of "excellent."

Various changes and modifications may be made in the method and compositions of this invention, certain preferred forms of which have been herein described, without departing from the spirit and scope of this invention. These modifications in this basic invention are to be regarded as within the scope and purview of this invention.

EXAMPLE 9

Preparation of polyamide modified flexible phenolic resin by reaction of nylon with phenol and formaldehyde in the persence of anhydrous formic acid.

Into a one liter, three-necked resin flask equipped with a thermometer, stirrer and addition funnel were charged 60 grams of nylon 66, 240 grams of phenol and 120 grams of anhydrous formic acid. The resulting mixture was stirred at 65 degrees centigrade to give a homogeneous solution.

To this homogeneous solution, 300 grams of 37% aqueous formaldehyde were added dropwise so as to maintain a clear reaction mixture. After completion of addition, the dehydration condensation under reduced pressure was carried out until the reaction mixture gave a clear, transparent and very viscous resin. Such resin is completely soluble in alcohol and contains 20% of polyamide.

Preparation of stable solution: The resin as produced by the above procedure was washed several times with 10% $Na_2CO_3$ solution to remove traces of formic acid and the viscous resin was dissolved into 580 ml. of 1,3-dioxolane to give clear stable solution. This 1,3-dioxolane can be used for coating and impregnating resin system directly. The presence of 1,3-dioxolane system acts as a solvent as well as a curing agent promoter.

EXAMPLE 10

Preparation of polyamide modified flexible aniline formaldehyde resin by reaction of nylon with aniline and formaldehyde in the presence of anhydrous formic acid.

Into a one liter three-necked resin flask equipped with a thermometer, stirrer and addition funnel were charged 100 grams of anhydrous formic acid and 60 grams of nylon 66. To this 200 grams of aniline were added dropwise to maintain a clear solution. To this 250 grams of 37% aqueous formaldehyde solution were added. After completing the addition, the reaction mixture was stirred at about 60° C. for one hour, then dehydration and condensation were carried out at reduced pressure to give a clear bright yellow resin. The resin was washed with 10% $Na_2CO_3$ solution to give a clear viscous resin. The resin was soluble in an alcohol, 1,3-dioxolane mixture and contains 20% of polyamide. The resin can be cured at 130° C. to give clear flexible films.

EXAMPLE 11

Preparation of polyamide modified flexible thiophenol formaldehyde resin by reaction of nylon with thiophenol and formaldehyde in the presence of formic acid.

Into a one-liter three-necked flask equipped with a thermometer, stirrer and addition funnel were charged 60 grams of nylon 66, 230 grams of thiophenol and 100 grams of formic acid. The resulting mixture was stirred at 60° C. for one hour to give clear solutions. To this solution was added 250 grams of 37% aqueous formaldehyde in dropwise manner to maintain a clear solution.

Upon completing the addition, the reaction mixture was stirred at 65° C. for two hours then the reaction mixture was subjected to dehydration condensation at reduced pressure to give a clear viscous resin product. The product was similar to that of phenol formaldehyde and aniline formaldehyde products contains 10% polyamide, and was soluble in alcohol and 1,3-di-doxolane solvents. The product was cured at 130° C. to give a flexible clear film.

I claim:

1. A flexible, thermosetting polymer completely soluble in ethanol containing units of the formula:

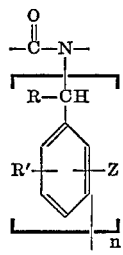

where Z is selected from the group consisting of —OH, —SH, and —NH$_2$ and $n$ has a value of 4–9, R is selected from the group consisting of hydrogen, formyl (—CHO), formalkylene, alkyl, cycloalkyl, and cycloalkene and R$^1$ is selected from the group consisting of hydrogen, halogen, alkyl, cycloalkyl, aryl and aralkyl groups, wherein said polymer is produced by (1) condensing at a pH of less than 7 and a temperature between about −20 degrees centigrade and about 200 degrees centigrade, a polymer dissolved in a hydrogen bonding solvent, said dissolved polymer containing a segmer having at least one displaceable hydrogen atom attached to a carbamido nitrogen function with an aldehyde in the presence of an aromatic compound containing an ortho-para activating group selected from the group consisting of —OH, —SH, and —NH$_2$ to form a polymer containing an active pendant methylol group, and (2) reacting said pendant methylol group with an aromatic compound containing an ortho-para activating group selected from the group consisting of —OH, —SH, and —NH$_2$, to form a modified polymer containing a pendant aralkylene group.

2. The polymer of claim 1 wherein said polymer containing a carbamido nitrogen function is nylon, said aldehyde is formaldehyde and said aromatic compound is phenol.

3. The polymer is claim 1 wherein said polymer containing a carbamido nitrogen function is polyacrylamide, said aldehyde is formaldehyde and said aromatic compound is phenol.

4. The cured product of claim 1.

5. The polymer of claim 1 wherein Z is SH.

6. The polymer of claim 1 wherein Z is NH$_2$.

7. The polymer of claim 1 wherein Z is OH.

8. A method for producing a flexible, thermosetting polymer completely soluble in ethanol containing units of the formula:

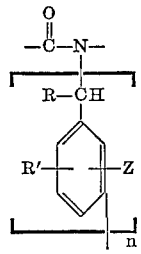

where Z is selected from the group consisting of —OH, —SH, and —NH$_2$ and $n$ has a value of 4–9, R is selected from the group consisting of hydrogen, formyl (—CHO), formalkylene, alkyl, cycloalkyl, and cycloalkene and R' is selected from the group consisting of hydrogen, halogen, alkyl, cycloalkyl, aryl and aralkyl groups, wherein said polymer is produced by (1) condensing at a pH of less than 7 and a temperature between about −20 degrees centigrade and about 200 degrees centigrade, a polymer dissolved in a hydrogen bonding solvent, said dissolved polymer containing a segmer having at least one displaceable hydrogen atom attached to a carbamido nitrogen function, with an aldehyde in the presence of an aromatic compound containing an ortho-para activating group selected from the group consisting of —OH, —SH, and —NH$_2$ to form a polymer containing an active pendant methylol group, and (2) reacting said pendant methylol group with an aromatic compound containing an ortho-para activating group selected from the group consisting of —OH, —SH, and —NH$_2$, to form a modified polymer containing a pendant aralkylene group.

9. The method of claim 8 wherein said polymer containing a carbamido nitrogen function is nylon present in said polymer to the extent of 10 to 20 weight percent, said aldehyde is formaldehyde and said aromatic compound is phenol.

10. The method of claim 8 wherein said polymer containing a carbamido nitrogen function is polyacrylamide, said aldehyde is formaldehyde and said aromatic compound is phenol.

References Cited
UNITED STATES PATENTS

| | | | |
|---|---|---|---|
| 3,363,025 | 1/1968 | Fitko et al. | 260—841 |
| 2,292,442 | 8/1942 | Hanford | 260—841 |
| 2,388,676 | 11/1945 | Coffman et al. | 260—841 |
| 2,500,054 | 3/1950 | Anthony et al. | 260—840 |
| 2,978,432 | 4/1961 | Graulich et al. | 260—844 |
| 3,014,886 | 12/1961 | Harding | 260—844 |
| 3,296,022 | 1/1967 | Timmer et al. | 260—841 |

JOHN C. BLEUTGE, Primary Examiner

U.S. Cl. X.R.

260—840, 844, 849, 851, 857 R, 857 F, 877

PO-1050
(5/69)

UNITED STATES PATENT OFFICE
CERTIFICATE OF CORRECTION

Patent No. 3,753,272          Dated  October 2, 1973

Inventor(s)  Sung Ki Lee

It is certified that error appears in the above-identified patent and that said Letters Patent are hereby corrected as shown below:

Column 4, Equation (9), line 65, that portion of the product of the equation reading

should read

Column 10, line 3, "piper" should read --paper--;
line 34, "13" should read --130--. Column 13, line 21,
after "products" insert --but--. Column 12, line 20,
"Fexibility" should read --Flexibility--.

Signed and sealed this 17th day of September 1974.

(SEAL)
Attest:

McCOY M. GIBSON JR.          C. MARSHALL DANN
Attesting Officer            Commissioner of Patents